United States Patent [19]

Holtman et al.

[11] 4,282,837
[45] Aug. 11, 1981

[54] TWO-CYCLE DIESEL ENGINE WITH PISTON RING STABILIZING ACCUMULATOR VOLUME

[75] Inventors: Robert L. Holtman; Robert B. McClure, both of Indianapolis, Ind.

[73] Assignee: General Motors Corporation, Detroit, Mich.

[21] Appl. No.: 72,580

[22] Filed: Sep. 5, 1979

[51] Int. Cl.³ ............................................... F02F 7/00
[52] U.S. Cl. ................................... 123/193 P; 92/214
[58] Field of Search ............. 92/214, 175; 123/193 P, 123/193 R

[56] References Cited

U.S. PATENT DOCUMENTS

| | | | |
|---|---|---|---|
| 1,218,986 | 3/1917 | Dodge | 123/193 P |
| 2,136,416 | 11/1938 | Dehn | 123/193 P |
| 2,915,348 | 12/1959 | Arnold | 123/193 P |
| 3,104,922 | 9/1963 | Baster | 123/193 P |
| 3,667,443 | 6/1972 | Currie | 123/193 P |
| 4,060,059 | 11/1977 | Blaser | 123/193 P |
| 4,083,292 | 4/1978 | Goloff | 92/176 |
| 4,111,104 | 9/1978 | Davison | 123/193 P |
| 4,138,984 | 2/1979 | Steidle | 123/193 P |

Primary Examiner—Ronald B. Cox
Attorney, Agent, or Firm—Robert J. Outland

[57] ABSTRACT

A two-stroke cycle diesel engine having ported cylinders is provided with a piston having an accumulator volume between the two top piston rings, the volume being sized large enough in relation to the piston ring leakage area and operating conditions to limit the buildup of gas pressure between the rings to a value below that of the cylinder pressure during nearly all conditions of normal engine operation. The arrangement substantially stabilizes the position of the top piston ring against the bottom of its piston ring groove, thereby avoiding shock loading of the top ring through cyclic unseating due to differential pressure reversals.

2 Claims, 3 Drawing Figures

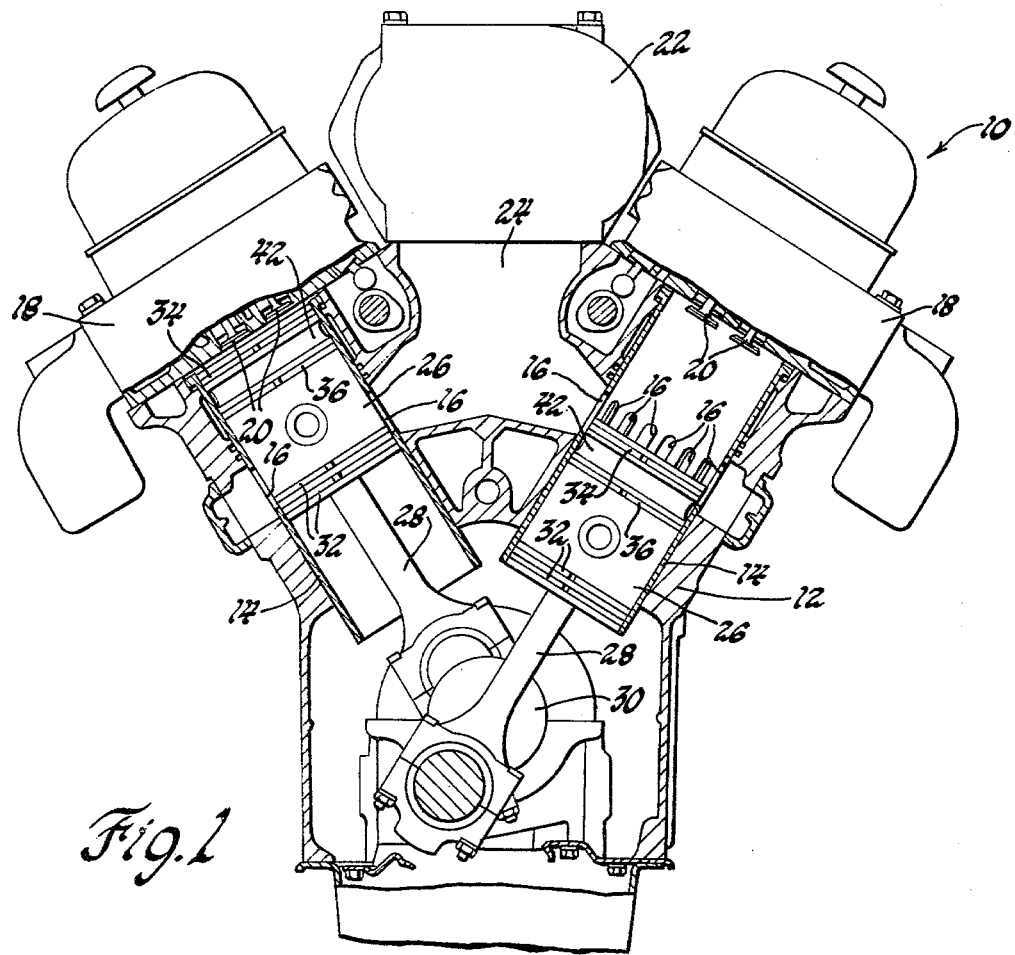
Fig.1
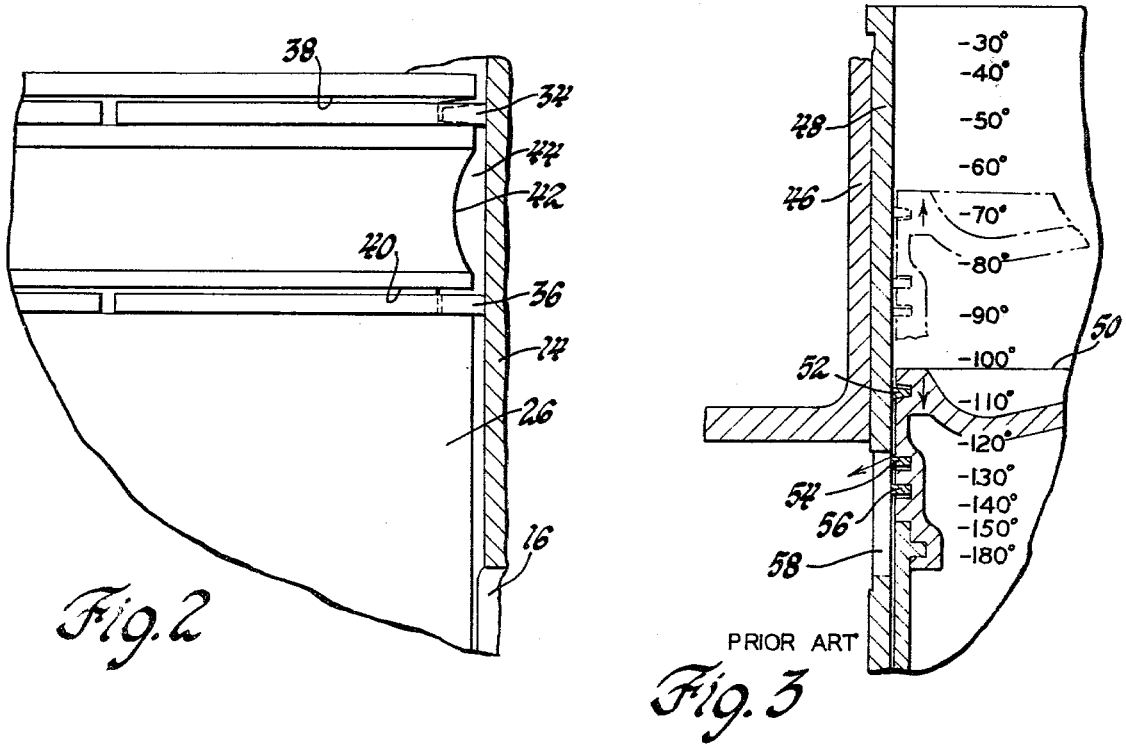
Fig.2
Fig.3 PRIOR ART

TWO-CYCLE DIESEL ENGINE WITH PISTON RING STABILIZING ACCUMULATOR VOLUME

TECHNICAL FIELD

This invention relates to internal combustion engines and more particularly to two-stroke cycle diesel engines of the type having ported cylinders. In its more particular aspects, the invention relates to the stabilizing of engine piston rings in ported two-stroke cycle diesel engines.

BACKGROUND OF THE INVENTION

Over a period of years, engineers and designers of internal combustion engines, including diesel engines, have provided increasingly improved designs of engine cylinders, pistons and piston rings leading to relatively trouble-free operation over greatly extended operating periods. Improvements in operating life have, however, been offset to some extent by repeated increases in engine specific power wherein greater and greater operating loads have been placed upon new designs of engine cylinders and pistons without increasing their size. As a result, the operating conditions under which cylinders, pistons and piston rings are required to operate have become increasingly severe.

It has been recognized that one limitation on the load carrying and wear resisting capabilities of engine piston rings has been the tendency under certain operating conditions to breakage of the ring, particularly the top ring, usually with resultant damage to the cylinder and piston assembly requiring replacement of these parts. Some causes of such breakage have been found and cured. However, a long-standing problem of this sort, existing in two-stroke cycle diesel engines having ported cylinders and a plurality of compression piston rings, has, until now, defied solution by engine designers and contributed to limiting the potential wear-life and specific power capability of engine cylinder assemblies.

SUMMARY OF THE INVENTION

The present invention resulted from our discovery that the operating life of the top piston rings in ported cylinder two-stroke cycle diesel engines of the type studied has been, in many cases, shortened by shock-loading occasioned by differential pressure reversals across the top ring during downward motion of the piston on its expansion stroke. Through evaluation and testing of prior art engine arrangements, we have found that, under certain operating conditions often encountered, the pressure between the top two compression rings on a piston may exceed the decreasing cylinder pressure at some point before the end of the expansion stroke, causing a reversal of the usual differential pressure levels acting on the top piston ring. Further movement of the piston downwardly, to where the second piston ring reaches the cylinder ports, drops the pressure between the rings to that of the engine air supply again rapidly reversing the differential pressure conditions on the top ring. These pressure reversals have been shown to create severe shock loads on the top piston ring by rapidly forcing the ring to move from one side of its groove to the other with the change in pressure conditions and this shock loading is considered responsible for shortening the operating life of many top piston rings in two-stroke cycle diesel engines of the type described.

The present invention provides a modified piston and ring assembly which, in combination with a two-stroke cycle ported cylinder diesel engine, provides a construction wherein pressures between the upper piston rings are maintained, at all times of normal engine operation below the engine cylinder pressures, thus avoiding pressure reversals across the top piston ring and the resultant shock-loading of the ring. This result is accomplished by increasing, if necessary, the space between the two top piston rings of the engine and providing therebetween an accumulator volume of sufficient size that leakage from the cylinder past the top piston ring is insufficient under normal operating conditions to increase the pressure between the piston rings to a point where it equals the cylinder pressure at any time during the expansion stroke. In this way, the problem of pressure reversals across the top piston ring is completely avoided.

These and other features of the invention will be more fully understood from the following description of a preferred embodiment taken together with the accompanying drawing.

BRIEF DESCRIPTION OF THE DRAWING

In the drawing:

FIG. 1 is a partial transverse cross-sectional view of a V-type two-stroke cycle ported cylinder diesel engine having piston accumulator volume means between the top piston rings in accordance with the invention;

FIG. 2 is an enlarged view of a portion of FIG. 1 showing the piston, piston ring, and cylinder construction in more detail; and FIG. 3 is a fragmentary cross-sectional view of a prior art piston and cylinder construction illustrating the mode of piston ring vibration encountered with the prior art construction which is overcome by the present invention.

DESCRIPTION OF THE PREFERRED EMBODIMENT

Referring first to FIG. 1 of the drawings, there is shown a two-stroke cycle diesel engine generally indicated by numeral 10. Except for the pistons to be subsequently described, engine 10 is of conventional construction having a cylinder block 12 defining two V-arranged cylinder banks carrying a plurality of cylinder defining cylinder liners 14 having centrally disposed inlet ports 16. Cylinder heads 18 mounted on the respective cylinder banks close the ends of the cylinders and carry exhaust valves 20 which control the flow of cylinder exhaust gases to exhaust passages within the cylinder heads.

A Roots type charging air blower 22 is mounted on the cylinder block between the cylinder heads to discharge air into a central plenum or air box 24 within the cylinder block. At its lower edges the air box extends around the inlet port areas of the various cylinder liners in order to provide for the delivery of air to the inlet ports for charging the cylinders. Opening and closing of the ports is accomplished by the reciprocating motion of pistons 26 disposed within the cylinders and connected by connecting rods 28 to the throws of a crankshaft 30 that is rotatably supported in the crankcase defined by the lower end of the cylinder block.

The pistons may be of any construction suitable for use in ported cylinder two-cycle engines. In the illustrated embodiment, they are similar in construction to the crosshead type piston shown in U.S. Pat. No. 3,555,972 Hulsing, assigned to the assignee of the present invention. The pistons are provided with a pair of cylinder engaging oil control rings 32 to control in known fashion the amount of lubricating oil remaining on the cylinder walls for piston lubrication.

As best shown in FIG. 2, the pistons further carry near their upper ends a pair of axially spaced first and second compression rings 34,36 respectively. These rings are respectively carried in grooves 38,40 machined into the sidewall of the piston head for that purpose. Between the two compression rings, the wall of the piston head is provided with an annular recess 42 which, together with the clearance between the piston and its surrounding cylinder, defines an accumulator volume 44 of predetermined size provided for a purpose to be subsequently described.

Referring now to FIG. 3, there is illustrated for comparative purposes a portion of a prior art engine piston and cylinder arrangement including portions of a cylinder block 46 containing a cylinder liner 48 having reciprocably disposed therein a crosshead piston 50 of the type shown in the previously mentioned U.S. Pat. No. 3,555,972. Piston 50 carries in the wall of its head portion three compression rings including a top or fire ring 52 spaced at some distance axially from second and third compression rings 54 and 56 respectively, located below.

Rings 52, 54 and 56 are carried in appropriately shaped annular grooves machined into the outer wall of the piston head. As is conventional, the grooves are formed slightly wider in an axial direction than the thickness of the piston rings so that the rings are free to move within the grooves and will avoid becoming stuck therein due to cylinder deposits and the like. Each of the piston rings is conventionally split to provide for installation on the piston. Thus, a small end gap exists at installation through which blow-by gases can leak from the upper cylinder above the piston to the spaces between the rings and below. Such gas leakage is limited by the sizes of the ring gaps and such other leakage paths as may exist. The cylinder liner conventionally includes a plurality of inlet ports 58 through which charging air is allowed to enter the cylinder when the piston is near its bottom dead-center position and the remainder of the engine, not shown, is of construction similar to that described for the engine of FIG. 1.

In operation of a two-stroke cycle diesel engine of the type described, rotation of the crankshaft is caused by reciprocation of the pistons through a cycle which includes compression and expansion strokes. Exhaust of waste gases and scavenging of each cylinder takes place beginning near the end of the expansion stroke and continuing through the early part of the compression stroke when its respective piston uncovers the cylinder inlet ports. The operational cycle includes charging the cylinder with air when the inlet ports are open and subsequently compressing the air charge by upward movement of the piston on its compression stroke. Near the piston top dead center, fuel is injected by means not shown and, because of the high compression, ignites and burns, raising the cylinder pressure. Downward movement of the piston on its expansion stroke reduces the cylinder pressure while at the same time delivering power to the engine crankshaft through the connecting rod. Near the bottom of the expansion stroke, the exhaust valves are opened and the piston uncovers the inlet ports so that exhaust gas passes out the exhaust ports and a new charge of fresh air enters the inlet ports, scavenging and charging the cylinder.

We have discovered that the operation of pistons of the prior art type illustrated in FIG. 3 in accordance with the above-described conventional cycle of the two-stroke cycle diesel engine may, under normal operating conditions, result in rapid reversals of pressure acting on the top compression ring or fire ring, causing the ring to vibrate axially within its groove and resulting in shock loads that may substantially shorten its life. To some extent, similar results may be encountered with respect to the second compression ring also.

The mechanism of piston ring vibration, just referred to, is believed to occur as follows. As the engine cylinder pressure above the piston is increased during compression and combustion processes, some of the gas in the cylinder blows by the piston rings through the clearance at the end gaps as well as through other leakage spaces which may exist. In this way the pressure between the piston rings increases, although at a lower rate than the cylinder pressure, the pressure accumulating between the first and second compression rings rising to a significant value substantially lower than the maximum cylinder pressure.

Thereafter, as the piston moves downwardly on its expansion stroke, the reduction in cylinder pressure may reach a point where the cylinder pressure drops below the residual pressure existing between the first and second compression rings. At or somewhat below this point, the now higher pressure below the top piston ring forces the ring off its seat on the lower land of the piston ring groove and upwardly against the upper side of the ring groove, in a motion which causes a significant shock-loading of the ring.

Subsequently, upon further downward motion of the piston, the space between the two top piston rings is vented to the air box as the second compression ring moves downwardly to a point below the tops of the cylinder inlet ports. When this occurs, the pressure between the top rings drops suddenly to air box pressure and the residual cylinder pressure, which is now higher than the pressure between the rings, again forces the top piston ring downwardly from its position against the upper ring land to a position on the lower land of the piston ring groove. This movement again subjects the ring to a substantial shock-loading which, it has been indicated, can substantially shorten the life of the ring.

We have determined through analysis and practical testing that this shock-loading of the top piston ring can be substantially avoided or eliminated through appropriate selection of piston and ring designs which prevent the pressure between the top two piston rings from exceeding the cylinder pressure under nearly all normal operating conditions. This has been accomplished in the illustrated embodiment of the present invention by modifying the design of the prior art piston shown in FIG. 3 to eliminate completely the second compression ring groove and utilize instead only the original first and third compression ring grooves which now become the first and second ring grooves 38,40 as shown in FIG. 2.

Between these two ring grooves and their associated compression rings 34,36, we have provided an accumulator volume partly defined by an annular recess 42 in the piston wall. The size of this volume is made large enough in relation to the leakage area of the top piston ring as well as the engine cylinder pressures and engine speeds encountered in normal operation, so that the blow-by gas leaking past the top piston ring will not be of sufficient volume in the time period allowed to raise the pressure between the top two piston rings to a point which equals the residual cylinder pressure at any point during engine operation. When these conditions are met, the operation of the top piston ring is completely stabilized since no differential pressures occur to drive the piston ring off the lower land of the piston ring groove. Thus, the piston ring remains stable and shock-loads on the ring due to movement between the upper and lower lands are completely avoided.

Since the various speeds and loads of normal engine operation may yield differing results as to the likelihood and degree of pressure reversal conditions, it should be recognized that piston designs may be satisfactory which provide stabilized ring performance under most but not all conditions of engine operation and such improved designs are within contemplation of the invention. Further, it should be understood that although the invention has been described by reference to a preferred specific embodiment representing the best mode presently known to the inventors for making and using the invention, many changes might be made in the various details of the invention without departing from the inventive concepts described. Accordingly, it is intended that the invention not be limited to the illustrated details, but that it have the full scope permitted by the language of the following claims.

We claim:

1. The combination in a two-stroke cycle diesel engine of the type having a piston with at least two axially spaced split metal compression sealing rings retained in grooves near one end of the piston, the piston being reciprocable within a ported cylinder to alternately cover the ports for retention of cylinder pressure at said one piston end during compression and expansion strokes and uncover the ports for scavenging and recharging of the cylinder during a portion of the piston motion at the low pressure end of said strokes, wherein the improvement comprises an accumulator volume defined by the piston between the two rings closest to said one end of the piston, said volume being sized large enough in relation to the piston ring leakage area, engine cylinder pressures and normal operating speeds to limit the build-up of gas pressure in the volume between the rings to a value below that of the cylinder pressure during nearly all conditions of normal engine operation, whereby shock loading of the end ring through cyclic unseating due to differential pressure reversals is substantially avoided.

2. The combination in a two-stroke cycle diesel engine of the type having a piston with at least two spaced split metal compression sealing rings retained in grooves near one end of the piston, the piston being reciprocable within a ported cylinder to alternately cover the ports for retention of cylinder pressure at said one piston end during compression and expansion strokes and uncover the ports for scavenging and recharging of the cylinder during a portion of the piston motion at the low pressure end of said strokes, wherein the improvement comprises a recess in the piston defining an accumulator volume between the two rings closest to said one end of the piston, said volume being sized large enough in relation to the piston ring leakage area, engine cylinder pressures and normal operating speeds to limit the build-up of gas pressure in the volume between the rings to a value below that of the cylinder pressure during nearly all conditions of normal engine operation, whereby shock loading of the end ring through cyclic unseating due to differential pressure reversals is substantially avoided.

* * * * *